US008573276B2

(12) United States Patent
Wade et al.

(10) Patent No.: US 8,573,276 B2
(45) Date of Patent: Nov. 5, 2013

(54) LABELS AND APPLICATION APPARATUS THEREFOR

(75) Inventors: Richard Wade, Leeds (GB); Michael John Cooper, Colchester (GB); Kevin Barwood, Dovercourt (GB)

(73) Assignee: Catchpoint Ltd., Leeds (GB)

( * ) Notice: Subject to any disclaimer, the term of this patent is extended or adjusted under 35 U.S.C. 154(b) by 1043 days.

(21) Appl. No.: 11/795,485

(22) PCT Filed: Jan. 23, 2006

(86) PCT No.: PCT/GB2006/000226
§ 371 (c)(1), (2), (4) Date: May 6, 2008

(87) PCT Pub. No.: WO2006/077434
PCT Pub. Date: Jul. 27, 2006

(65) Prior Publication Data

US 2008/0307686 A1 Dec. 18, 2008

(30) Foreign Application Priority Data

Jan. 22, 2005 (GB) .................................. 0501369.3

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ............................ 156/521; 156/557; 156/552

(58) Field of Classification Search
USPC ................. 156/521, 362, 557, 256, 270, 552; 225/100, 97, 98, 96.5
See application file for complete search history.

(56) References Cited

U.S. PATENT DOCUMENTS

| | | | | |
|---|---|---|---|---|
| 4,375,189 | A * | 3/1983 | Berner et al. | 101/68 |
| 5,172,936 | A | 12/1992 | Sullivan et al. | |
| 5,540,369 | A | 7/1996 | Boreali et al. | |
| 5,711,836 | A | 1/1998 | Hill et al. | |
| 5,874,142 | A | 2/1999 | Hoffman et al. | |
| 6,066,437 | A | 5/2000 | Keosslinger et al. | |
| 6,923,235 | B2 * | 8/2005 | Petitjean | 156/353 |
| 2001/0038204 | A1 | 11/2001 | Nojima et al. | |
| 2003/0035014 | A1 | 2/2003 | Adams et al. | |
| 2003/0124345 | A1 | 7/2003 | Faust et al. | |
| 2004/0033876 | A1 | 2/2004 | Vijuk et al. | |

FOREIGN PATENT DOCUMENTS

| | | |
|---|---|---|
| EP | 0 673 839 | 9/1995 |
| NL | 1 014 737 | 9/2001 |
| WO | 2004005141 | 1/2004 |

* cited by examiner

*Primary Examiner* — Linda L. Gray
(74) *Attorney, Agent, or Firm* — Klauber & Jackson LLC

(57) ABSTRACT

The invention relates to a label, and method and apparatus for forming and dispensing the same. The label is provided as part of a roll of labels. The labels are attached to each other and/or extraneous label or substrate material via a discontinuous line with bridge portions. The labels have a layer of adhesive and a release layer applied thereto and ink printed thereon. In one embodiment the adhesive is applied over the release layer of material prior to forming the roll and when the labels are taken from the roll the adhesive layer leaves the release layer and contacts with the face of the label which overlies the same in the roll.

5 Claims, 9 Drawing Sheets

LABELS AND APPLICATION APPARATUS THEREFOR

CROSS REFERENCE TO RELATED APPLICATIONS

The present application is a National Stage Application claiming the priority of co-pending PCT Application No. PCT/GB2006/000226 filed Jan. 23, 2006, which in turn, claims priority from Great Britain Application Serial No. GB 0501369.3, filed Jan. 22, 2005. Applicants claim the benefits of 35 U.S.C. §120 as to the PCT application and priority under 35 U.S.C. §119 as to the said Great Britain application, and the entire disclosures of both applications are incorporated herein by reference in their entireties.

The invention to which this application relates is a label and apparatus for the formation and application of the label, said label representing an improvement on labels of the conventional form and said apparatus providing an efficient and effective manner by which to form and apply said labels to articles.

For many years the provision of a layer of adhesive which allows the labels to be applied to an article has meant that the labels, prior to application on the article, are required to be positioned on a backing layer. When the label is to be applied, the same is removed from the backing layer and applied to the article. However this form of apparatus and process limits the possible uses for the label applications and also causes wastage of material because of the provision of the backing layer which is discarded after the application of the label.

The applicant, in their patent GB2405396, discloses an apparatus for dispensing a label from a web of labels onto an article by utilising a beak which serves to present the label to the article and allow initial contact between the article and label so as to cause the breakage of a number of contact points or bridges between the said label and the web, hence allowing the label to be removed from the web and applied to the article. This arrangement allows the label to be provided as part of a web without the need for a backing layer.

The aim of the present invention is to provide improvements to the apparatus for dispensing labels without backing layers, also described as linerless labels, and the labels.

In a first aspect of the invention there is provided a series of labels, said labels formed from a substrate, each of said labels having an ink pattern printed on at least one face, a layer of release material applied to at least part of a first face of the label, and a layer of adhesive applied to at least part of the first and/or a second face of the label, at least part of the periphery of the labels is defined by a discontinuous cut line applied through the substrate, said discontinuities in the cut line defining at least one bridge portion, to be broken to allow the release of the label from extraneous substrate and wherein the said labels in the series each have at least one with an adjacent label which allows the same to be retained in a joined relationship until one of the labels is removed and adhered to an article.

In one embodiment the adjacent labels are retained in contact by the at least one bridge portion after any extraneous substrate has been removed. In one embodiment a series of bridge portions attach adjacent labels to each other.

In one embodiment the series of labels are moved into a roll whereupon the labels can be subsequently separated for selective application to an article.

In one embodiment a layer of adhesive is applied to at least a portion of the first face of each label and the remainder of that face has no adhesive, or a second type of adhesive having a different characteristic to the first adhesive thereto. In one embodiment the first adhesive is more permanent or less peelable than the second adhesive.

In a further aspect of the invention there is provided apparatus for dispensing a series of labels in sequence onto one or more articles, said apparatus including a holder for a roll of labels, formed as a substrate, feed means to allow the free end of said substrate to be fed to a dispensing applicator to expose the forward end of the foremost label to contact with an article to which the label is to be applied, feed means to move said article and wherein guide means are provided to guide said label free end into contact and adherence with said article, and subsequent movement of the article with the free end of the label applied thereto causes the reminder of that label to be torn from the substrate and apply to the article, said tear occurring of bridge portions formed along a line of weakening formed between adjacent labels and/or a label and extraneous substrate material.

In one embodiment the apparatus includes a blade positioned so as to contact the substrate at or adjacent the line of weakening between the label being applied to the article and the remainder of the substrate to encourage the break to occur.

In one embodiment the blade is fixed in position. Alternatively the blade is movable towards and away from the substrate in a reciprocal manner and the movement is timed such that the blade contacts the line of weakening at the time when tearing of the same is required.

In one embodiment the substrate is positioned on a belt and fed to the applicator via the driven belt.

In a further aspect of the invention there is provided a method of forming a series of labels, said method comprising the steps of feeding a substrate strip, feeding the substrate to a station to cut a discontinuous line at each label location, said line defining the periphery of the label and said discontinuities forming bridge portions retaining the label with the substrate and/or adjacent labels, applying a release layer of material onto at least part of one face of the label, applying a layer of adhesive over the release layer and/or on the opposing face of the label and wherein the substrate strip passes an ink printing station to allow an ink pattern to be applied thereto.

In one embodiment the substrate is subsequently fed to an applicator which allows the bridge portions to be broken to release each label from the extraneous substrate and/or further labels in sequence.

In one embodiment the ink is applied prior to applying the layer of adhesive.

In one embodiment, the substrate is subsequently fed to a station at which the labels are separated from the surrounding substrate but remain in contact with adjacent labels and are then wound into a roll of labels with the surrounding substrate discarded. In this embodiment adjacent labels are joined by bridge portions along a discontinuous line and they are broken when the labels are subsequently removed from the roll to be applied to the article so as to separate each of the labels.

In whichever form, in one embodiment, each adjacent label is applied to successive articles. In an alternative embodiment the labels are provided in groups such that for example, first and second adjacent labels form a group to be applied to the same article, the next two labels form a group to be applied to the next article and so on. In this embodiment the ink pattern printed to one label compared to the other in the group may be 180 degrees opposed so as to aid the subsequent application of the label group to the article.

In one embodiment the layer of adhesive is applied over the release layer and when the labels are subsequently provided in a roll and/or during subsequent unrolling the adhesive layer separates from the release layer and applies to the face of a label lying in contact therewith and which face does not have a release layer applied thereto.

In one embodiment the layer of release material and/or adhesive is applied in register with the periphery of the label, either lying within the area defined by the periphery or overlapping the same by a controllable extent.

In one embodiment the release layer and/or adhesive material can be applied in a patterned form and, in a preferred embodiment, when applied in a patterned form, the pattern is in register with the ink pattern which has been applied to the label.

In one embodiment, and of particular benefit when the label is to be used to have variable data to be printed on a portion thereof, the portion on which the variable data is to be printed does not have a release layer material applied thereto. This therefore means that if for example the substrate is thermal paper impregnated at a particular portion with ink which reacts to heat, the lack of a release layer material at the said portion allows the thermal printing of the variable data to be achieved by heat activating the ink using existing apparatus.

The type of adhesive which is used can be selected to suit subsequent usage requirements of the label in terms of the type of article to which the labels are to be applied, the subsequent use of the articles and so on. Also the weight and depth of the coating can be adjusted using controllable parameters, such as for example, if anilux rollers are used to apply the adhesive the cell size of the rollers can be adjusted to suit requirement.

In one embodiment the inks which are used in the printing process are water based inks and a layer of varnish is applied over the ink to seal the same.

In a further aspect of the invention there is provided a label with a layer of adhesive of a particular type applied to a portion of the label face and the remainder of the label face has no adhesive or adhesive having a different characteristic to the first type applied thereto.

In one embodiment the first type of adhesive is more permanent or less peelable from an article than the second type of adhesive.

In one embodiment the portion of the face of the label which has no adhesive, or a more peelable adhesive has located therewith a further substrate portion. In one embodiment the further portion is at least partially separable from the host label. In one embodiment the separation is achieved by the provision of perforations. The further substrate portion can be folded, for example folded concertina style, and can be extended out to allow further information to be viewed when the same is at least partially released from the host label.

In one embodiment the host label and additional substrate, in combination, form an RFID tag, with the circuitry provided as part of the additional substrate.

In a further aspect of the invention there is provided a method of forming a series of labels, said method comprising the steps of feeding a substrate strip to a station to cut a discontinuous line at each label location, said line defining at least part of the periphery of the label and said discontinuities forming bridge portions retaining the label with extraneous substrate and/or adjacent labels, applying a release layer of material onto at least part of one face of the label, applying a layer of adhesive over the release layer and/or at least part of the opposing face of the label and wherein a printing step is performed on at least one face of the substrate to apply ink said ink being viewable through the label once applied to an article.

In one embodiment the substrate is transparent and the ink is applied in the printing step onto a face of the label prior to the application of adhesive thereover. In this case the printing can be viewed through the transparent substrate and so, when the label is applied to an article, the ink is protected from damage by the substrate of the label.

In a yet further aspect of the invention there is provided a method for the separation of a label from a strip of a series of labels for subsequent application to an article, said method including the steps of forming a series of labels in a linear relationship, an edge of each label defined by a discontinuous line, said discontinuities formed by bridge portions and a free end of the foremost label forming the free end of the strip is placed in contact and adherence with an article to which the same is to be applied and wherein subsequent relative movement between the article and the label breaks the bridge portions with the adjacent label, thereby freeing the label from the adjacent label and allowing adherence of the said label with the article.

Typically this process is repeated for each of the labels in synchronisation with the movement of the articles.

In one embodiment the relative movement of the article and label is achieved by controlling the speed of movement of the label feed and the article feed such that there is variation between the same for sufficient time to generate breaking force for the contact point. In a preferred embodiment the speed of movement of the articles is greater than the feed speed of the label, at least for a sufficient time period to achieve the required instant of separation of each label from the series of labels.

In addition or alternatively, the direction of movement of the articles is not in line or parallel with the direction of feed of the labels. Typically the degree of offset between the label feed path and articles path is sufficiently large so as to create a tearing action on the point of contact between the labels once the free end of the label has adhered to the article but is sufficiently small so as to ensure that the label is applied uniformly onto the surface of the article and no creasing of the label is caused when the same is on the article.

In a further aspect of the invention there is provided a method of printing and forming labels from a web of material, said method including the steps of applying ink using a digital printing process and then forming the periphery of said labels by die cutting the substrate at intervals therealong, said die cutting forming a discontinuous line with bridge portions retaining the labels in contact with the web.

As the printing and die cutting is performed in line the system is particularly useful for multi label designs on relatively short runs and the cutter profiles can be altered to suit laser die cutting with bridge portions. Thus the cutter profile can be altered for each label design run without the need for cutter forms to be prepared.

In a further aspect of the invention, there is provided a method of printing and forming labels from a web of material, said method including the steps of applying ink to the label, forming the periphery of each of said labels by die cutting the substrate at intervals therealong in a patterned manner, said die cutting forming a discontinuous line with bridge portions to retain the labels in contact with the substrate and/or adjacent labels and wherein a layer of laminate is applied to at least one side of the series of labels and wherein data is applied through the laminate and onto the substrate via a laser.

In a further aspect there is provided a method of printing and forming labels in conjunction with an article to which the label is to be applied, said method including the steps of applying ink to at least one surface of said label, applying said label to wrap around at least a portion of said article, said label having leading and trailing edges which are joined by respective side edges, said leading and trailing edges overlapping or being positioned adjacent thereto once the label is wrapped around the said article and wherein heat is applied to the side edge portions to cause the substrate from which the label is formed to wrap around the edges of the article and hence engage the label with the article.

In one embodiment, the surface of the label opposing that to which the ink is applied, has a layer of adhesive thereon at the time of applying the label to the article.

In one embodiment, portions of the label depending inwardly from the said side edges do not have ink applied thereto and it is these portions to which heat is applied.

In one embodiment, the article to which the label is applied is substantially cylindrical such as, for example, a battery, a bottle, a portion of the bottle or the like.

In one embodiment, the label has a perforated line formed intermediate the side edges of the same and running substantially parallel therewith, said perforated line acting as a release means once the label has been applied to the article and therefore acting as a tamper evident indicator.

Typically, the label of this type is formed in accordance with any of the methods and utilising any of the apparatus as already hereinbefore described.

In a further aspect of the invention there is provided apparatus for the forming of labels and the application of the same to articles, said apparatus including a holder for sheet material, feed means for moving a free end of said sheet material to cutting means, said cutting means including a die and anvil to form labels from the sheet material and wherein there is provided a transfer means leading from the cutting means on which said labels are moved to an application point at which the foremost label is applied to an article to adhere thereto and remove the remainder of the label from the transfer belt and into adherence with the article.

In one embodiment a guide roller is provided at the point of application to ensure the application of the label onto the article. Typically the articles are being fed to the application point in succession so as to allow register between the labels and the articles to be achieved.

In one embodiment the successive labels are separated at the time of cutting or alternatively the abutting edges of the labels remain joined together via at least one bridging portion, said portion broken to release the label when applied to the article.

In one embodiment the apparatus includes a further transfer belt, said transfer belt located downstream of the first transfer means and control means are provided to selectively allow the passage of labels from the first transfer belt to the said further transfer belt. In this embodiment the application point is formed on the said further transfer belt.

In one embodiment the apparatus includes a printing station located so as to apply printing to labels when positioned on the transfer belt and the said printing station allows the application of material which is specific to individual articles to which the labels are to be applied.

Specific embodiments of the invention are now described with reference to the accompanying drawings wherein.

Figure 4:
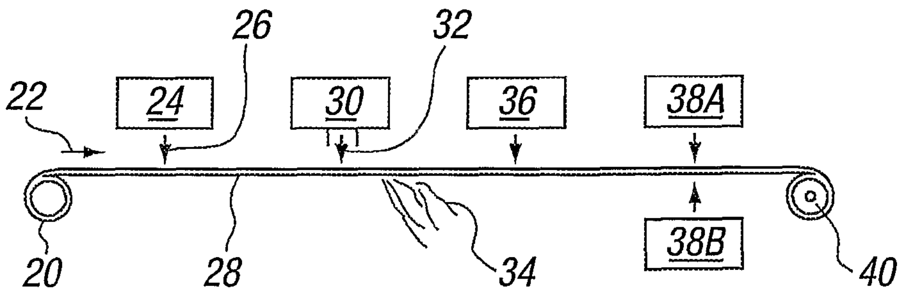
FIG. 4 illustrates in schematic form the method steps to be followed when forming the labels.
Figure 5A:
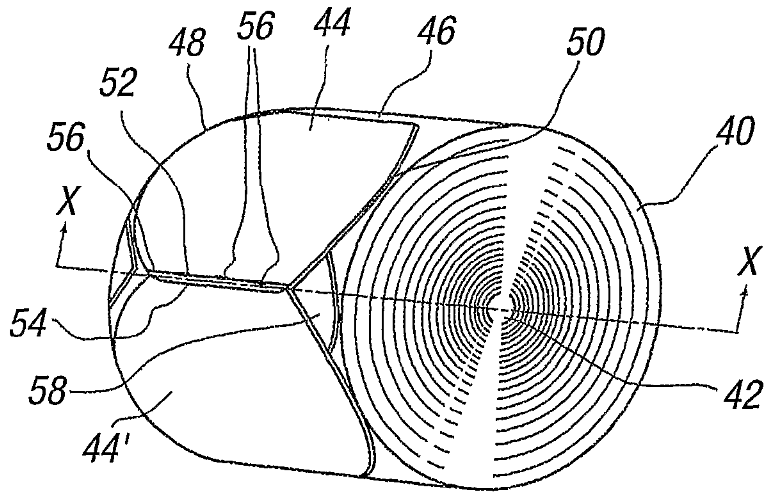

FIGS. 5*a* and *b* illustrate a roll of labels formed in accordance with the method of FIG. 4

Figure 6A:
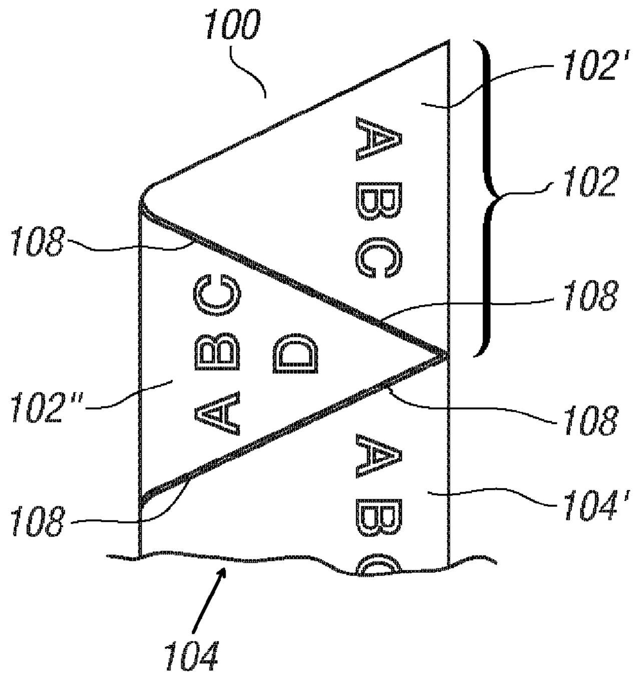
Figure 7A:
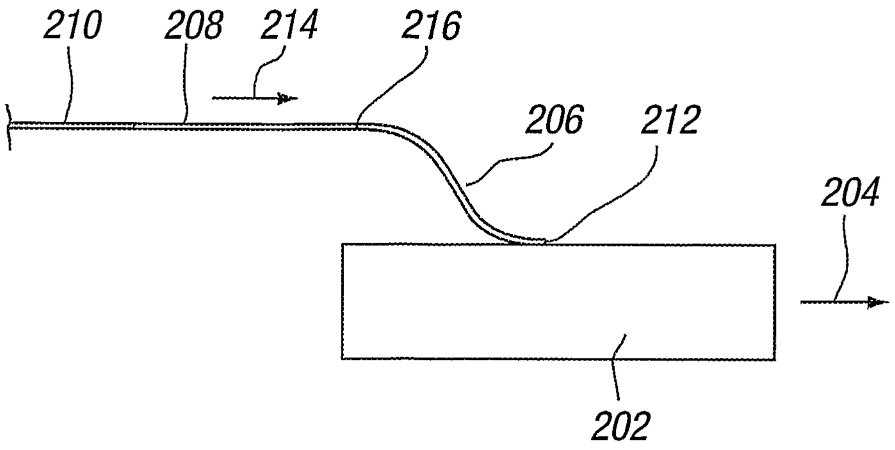
Figure 8A:
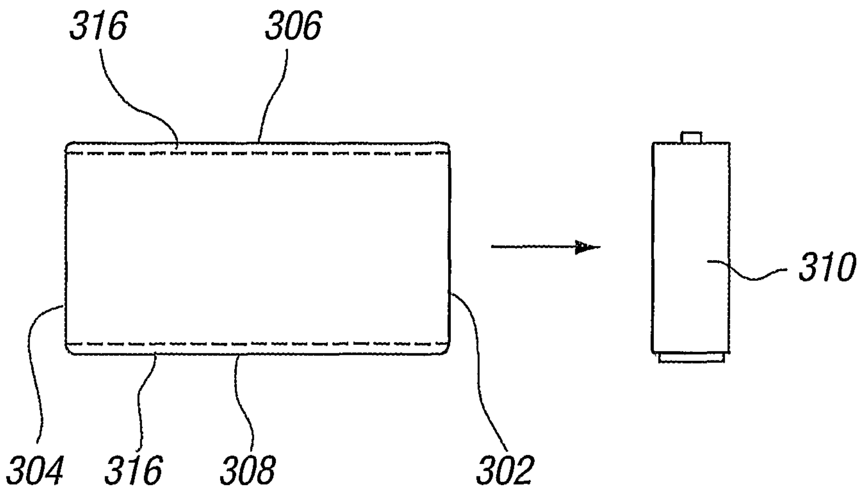
Figure 9A:
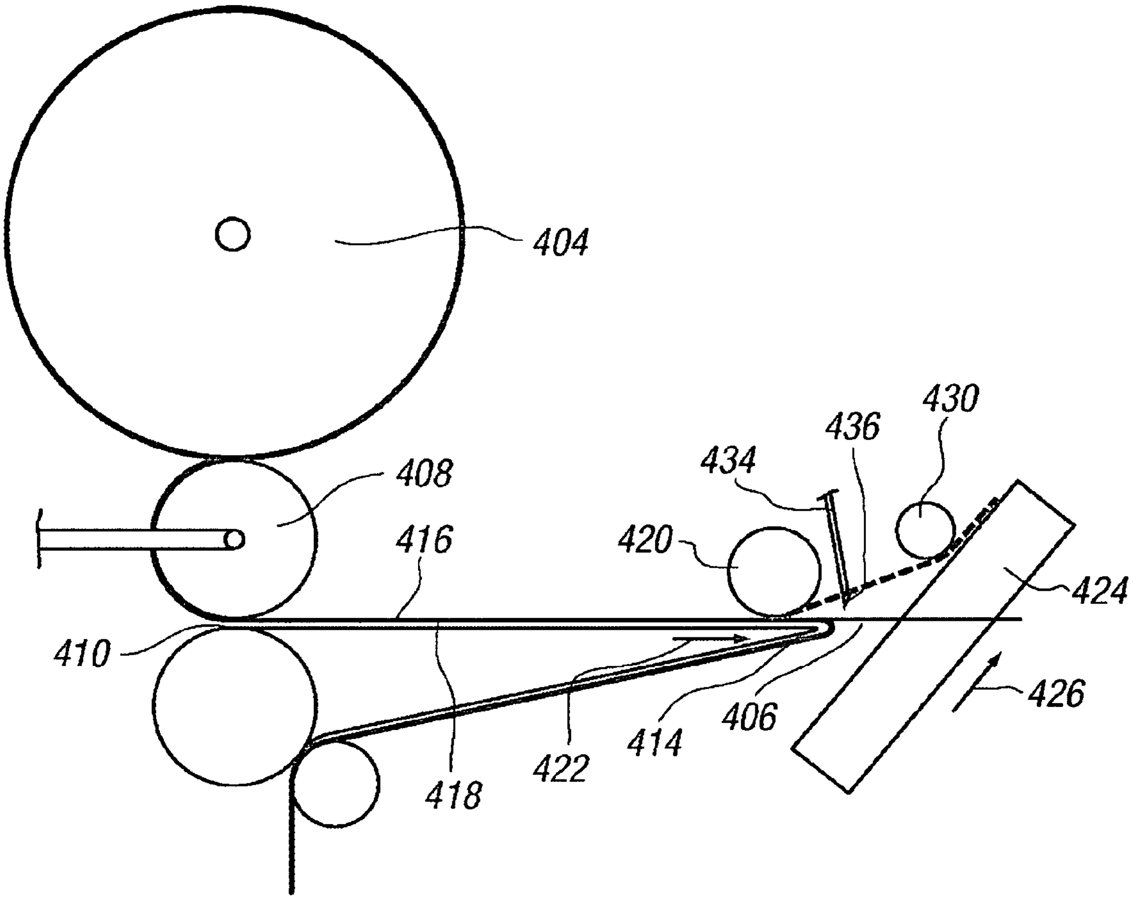
Figure 9B:
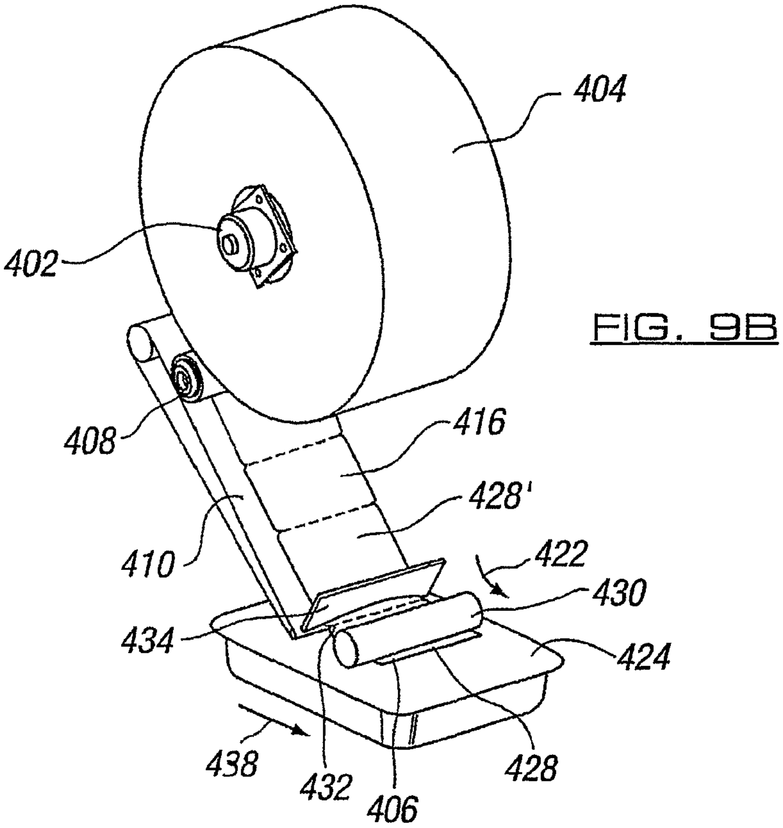
Figure 9C:
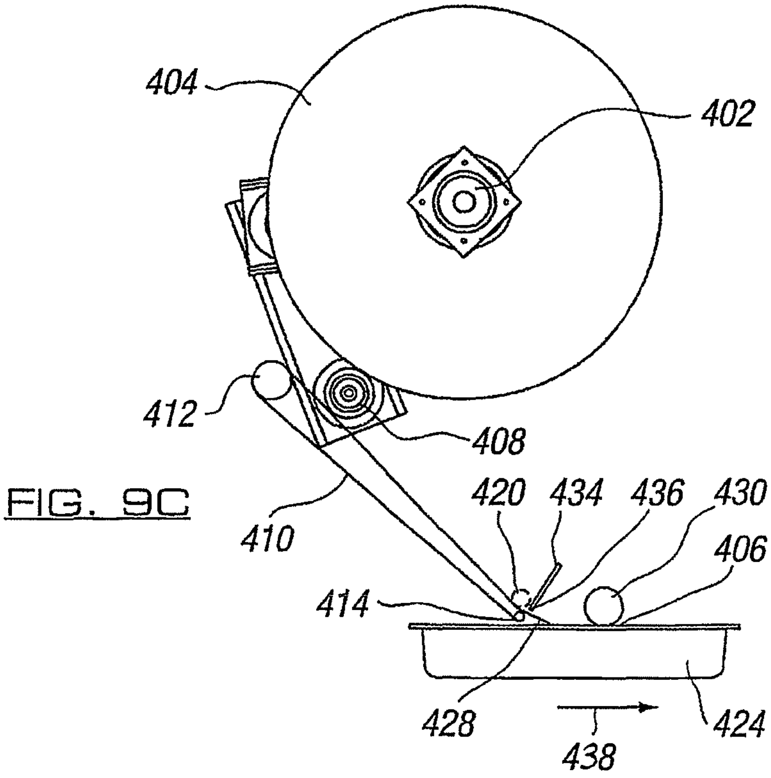

FIGS. 6*a* and *b* illustrate labels formed in groups for application to an article;

FIGS. 7*a* and *b* illustrate methods for separating labels when applying the same to articles;

FIGS. 8*a* and *b* illustrate further embodiments of the invention;

FIGS. 9*a-c* illustrate an embodiment of apparatus in accordance with the invention; and FIGS. 10*a-f* illustrate a further embodiment of apparatus in accordance with the invention.

Figure 1:
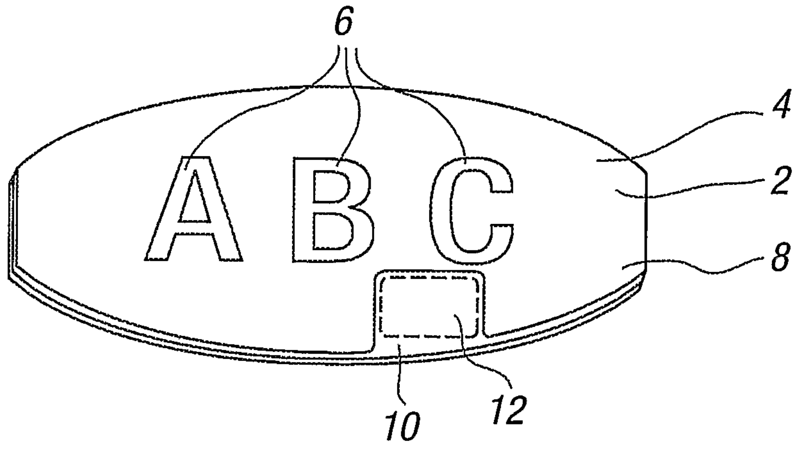
FIG. 1 illustrates a label formed in accordance with one embodiment of the invention.

Referring firstly to FIG. 1, there is provided a label 2 formed in accordance with the invention. The label comprises a substrate 4 which has a front surface as shown and onto which is applied printing 6 in a form which is required for the particular use of the label. Also typically provided on the front face of the label and overlying the ink of the printing is a release layer 8 which is of a clear material and again can be selected to suit particular requirements. In this embodiment of this particular label, and as illustrated for reference purposes only as the same would typically not be visible, the release layer is formed in a pattern such that a portion 10 does not have the release layer applied thereon. This is because, at that portion of the label, there is printed a thermally reactive ink 12. This is provided such that once the label has been applied to an article, such as a tray for foodstuffs, variable data is commonly required to be printed to indicate for example the weight of the foodstuff on that particular tray, the price and/or due date for consumption or other variable information. The ability to apply the release layer 8 in a patterned form means that the same can be applied with certainty and so for each label, the area 10 is left free and this is in register with the thermally reactive ink 12. Thus, when the label and article pass through the variable data printing station, the heat which is typically selectively applied to react with the ink 12, can be applied to react with the ink 12 and cause the variable data to be formed in the area 10 of the label.

Figure 2:
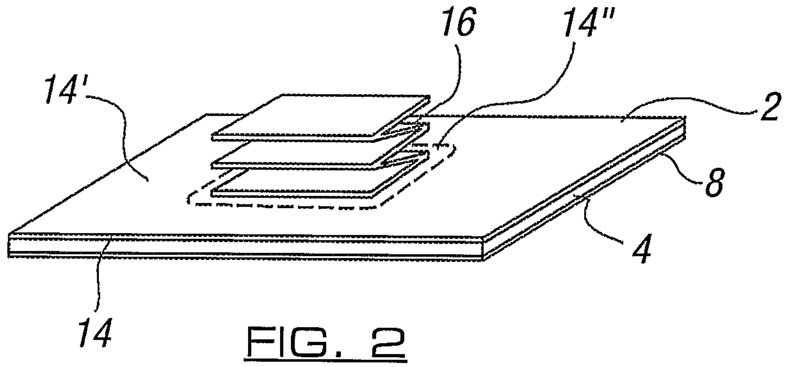
FIG. 2 illustrates a further form of label formed in accordance with one embodiment of the invention.

FIG. 2 illustrates a further label 2 in accordance with the invention. In this form, the label is formed of a substrate 4 with a front face which can have printing applied thereto although not shown in this particular embodiment. The label has a front face with a release layer 8 applied thereto and a rear face which is the face which is shown primarily in this figure, which has a layer of adhesive 14 applied thereto. In this case, the adhesive which is applied is of two different types such that there is a first area indicated by reference numeral 14' over which a permanent adhesive is applied and a second area 14" onto which a different, temporary adhesive is applied. In the area 14" there is applied a further article which, in this case, is a further label 16 which can be peelably removed from the label 2 once the same is removed from an article and then folded out, in a concertina fashion so as to allow the same to be removed from the label 2 and then looked at as a separate entity for the purpose of, for example, providing recipes, further information with regard to a particular article, further advertising or the like. As an alternative to the further label 16, an electronic circuit which could act as an RFID tag, can be applied and adhered thereon such that the first label 2 is used for carriage purposes and the RFID tag can then subsequently be used.

It should be appreciated that although in this case the label is described with the selected application of adhesive on the rear face, the same procedure can be followed to allow the selective application of an adhesive portion 14" on the front face so that the label 16 can be peelably removed from the front face of the label 2. It should therefore be appreciated that FIGS. 1 and 2 both illustrate features which can be achieved in accordance with the invention due to the ability to register the printing, release layer and/or adhesive so as to allow portions of the label to be selectively utilised for specific purposes.

Figure 3:
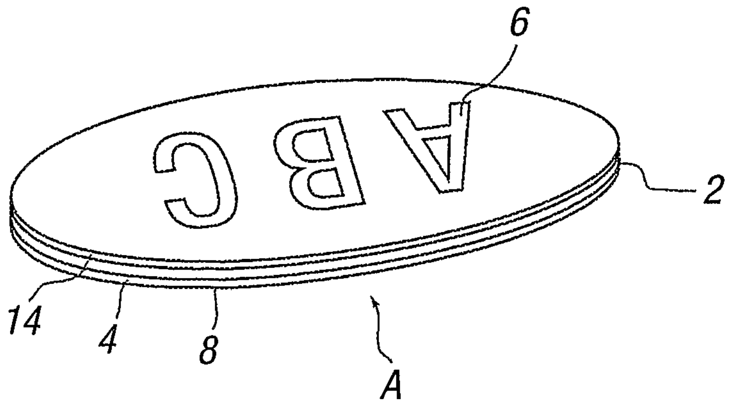
FIG. 3 illustrates a yet further form of label formed in accordance with the invention.

FIG. 3 illustrates a yet further label 2 in accordance with the invention. In this case, the substrate 4 is a transparent sheet material and on the front face there is provided a release layer 8 and on the rear face which is the face which is primarily shown in this figure, a layer of adhesive 14 is applied. It is also shown how the rear face has printing 6 applied thereon and the printing is applied in reverse such that the same is viewable, in the correct order, from the direction of the arrow A and is viewable through the transparent substrate. As will be explained subsequently, the printing is applied prior to the layer of adhesive 14 and therefore is encapsulated by the layer of adhesive 14. The printing is therefore protected from subsequent scuffing or damage.

Turning now to FIG. 4, there is illustrated in schematic fashion a typical method which can be followed to form a series of labels in accordance with the invention.

Initially, a roll 20 of the label substrate, such as paper or filmic sheet material, is unwound and fed in the direction of arrow 22 towards a first station 24. This station is provided to allow the application of ink onto the substrate to form the printing on the label as indicated by arrow 26. Any suitable printing type can be used such as flexible, rotary litho, screen, rotary gravure or the like. Equally, water-based ink can be used if required. The printing is applied at intervals along the substrate 28 as the same passes the station 24 such that a printed portion is applied for each label which is formed in a spaced configuration. The substrate 28 then passes to the station 30 which is provided with cutting means so as to apply a cutting operation on the substrate as indicated by arrow 32 and form the periphery of each of the labels along the substrate.

In one embodiment, and as indicated by 34, the excess substrate material can be discarded at this stage and all that then progresses to the next station 36 is a substrate of labels. In this case, adjacent labels are held in mutual contact at their adjacent edges as the cutting station 30 does not perform a total cut but rather cuts a discontinuous or weakening line leaving at least one bridging portion which bridges and hence keeps joined, the abutting edges of adjacent labels on the substrate. In one embodiment, the bridging portions are preferred to be as small as possible and may for example be at a frequency of 20 per inch and applied 5/1,000" wide.

With the label substrates formed but held together by the bridging portions, the substrate 28 passes to the station 36 which is provided with means to apply a release layer, typically over the printed face of each of the substrate labels. The substrate 28 then passes onto stations 38A and 38B. Depending on the particular method being followed in each instance, station 38A and/or 38B can be used to apply a layer of adhesive onto the substrate. In one embodiment, the layer of adhesive can be applied by station 38A over the release layer applied at station 36 or alternatively, station 38B can be used to apply a layer of adhesive on the opposing face of the substrate. In a further embodiment, both stations 38A and 38B can be used to apply adhesive layers as a uniform layer or in a pattern.

With the various stages completed for forming the labels, the substrate can then proceed to application means to allow the labels to be separated and applied to articles or alternatively, and perhaps more typically, the labels substrate is coiled into a roll such that the roll can then subsequently be transferred to apparatus for application of the labels then required. Typically the roll of labels will be formed at a different location than where they are to be applied.

Figure 5B:
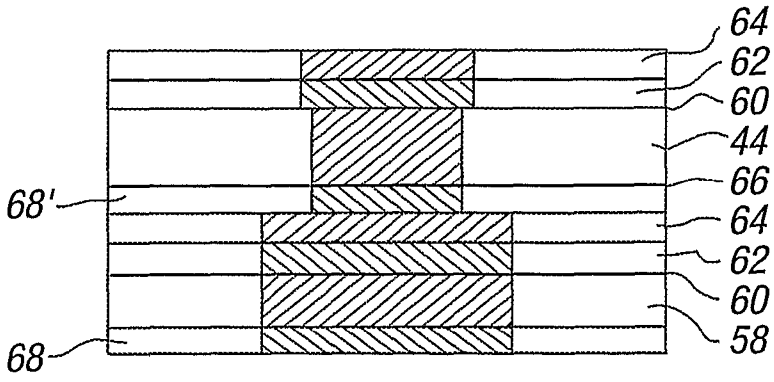

Turning now to FIGS. 5*a* and 5*b*, there is illustrated a roll 40 has been formed in accordance with the method of FIG. 4. It will be seen that the roll includes a series of substrate layers and a core 42. With reference to the external layer the same has a label 44, with the free end 46 of the same forming a foremost edge of the label 44 and, in this case, the label is shaped like a rugby ball so that the side faces 48, 50 depend outwardly towards the edge of the roll and then back in towards the opposing edge 52. The edge 52 abuts the edge 54 of the next label 44' on the roll and the edges 52 and 54 are held together by bridging portions indicated schematically by the reference numeral 56 although in practise, these bridging portions will be almost invisible to the eye. It is also apparent in this embodiment that no waste or skeletal substrate remains and the roll is formed entirely of the labels with the same overlying successive label layers on the roll.

FIG. 5*b* illustrates a cross sectional view along X-X through the outer and penultimate outer layers of the roll. Thus, there is shown, the label 44 and a label 58 which underlies the same in the roll. With regard to each label, there is provided on the front face 60, a printing layer 62 and a release layer 64. Intermediate the release layer 64 of the label 58, and the underface 66 of the label 44, is provided a layer of adhesive 68. In one embodiment, this layer of adhesive, during the method depicted in FIG. 4, can be applied directly onto the underside 66 of the label 44. Alternatively, and equally possible, the layer of adhesive 68 is applied onto the release layer of the label such that, in this example, the adhesive layer 68' is applied onto the release layer 64 of the label 58. This therefore means that at the time of formation, no adhesive layer is actually applied to the underside of each label. However, when the label substrate is formed into the roll 40, the adhesive layer 68 comes into contact with the underside of the overlying label and, because the layer of adhesive 68 is applied onto the release layer 64, the layer of adhesive 68 is more likely, and indeed does, transfer onto the underside of the overlying label such that when the labels are subsequently removed from the roll, each layer of adhesive 68 leaves the roll in attachment underside of the to the overlying label 44 or 58 and so on.

Figure 6B:
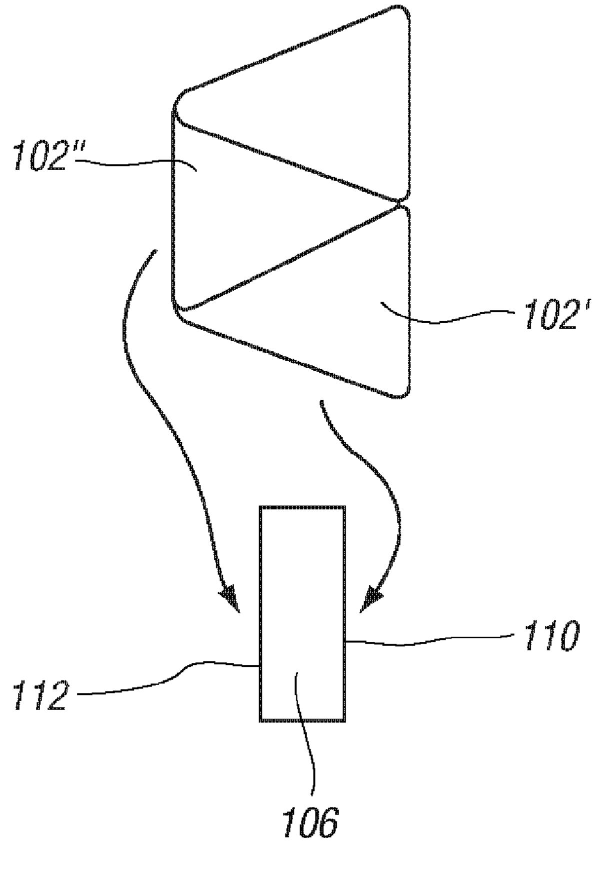

Turning now to FIGS. 6A and 6B, there is illustrated one method for forming and applying labels to different faces of an article. In this case, the label substrate 100 has a series of groups of labels, one of which, group 102, is shown and comprises labels 102' and 102". Part of the label 104' of the next group of labels 104 is shown and it will therefore be appreciated that the roll of substrate includes a series of said groups.

The labels 102' and 102" in each group are provided to be attached to different locations on an article 106 as shown in FIG. 6B. Thus, the labels 102' and 102" can have printing applied thereto which may differ between the labels as illustrated in FIG. 6A. The adjacent labels are held in respective relationship during the forming of the same by bridging portions 108 as illustrated, with the remainder of the edges of the labels separated by the die cutting process which has been performed previously. At the time of application, separation of the labels in each group is first performed and then each label is moved separately and independently of the other label or labels in the group and applied in the appropriate location, in this case, the front and rear faces 110, 112 of the article 106 thereby allowing the simultaneous application of labels of a group to an article.

Figure 7B:
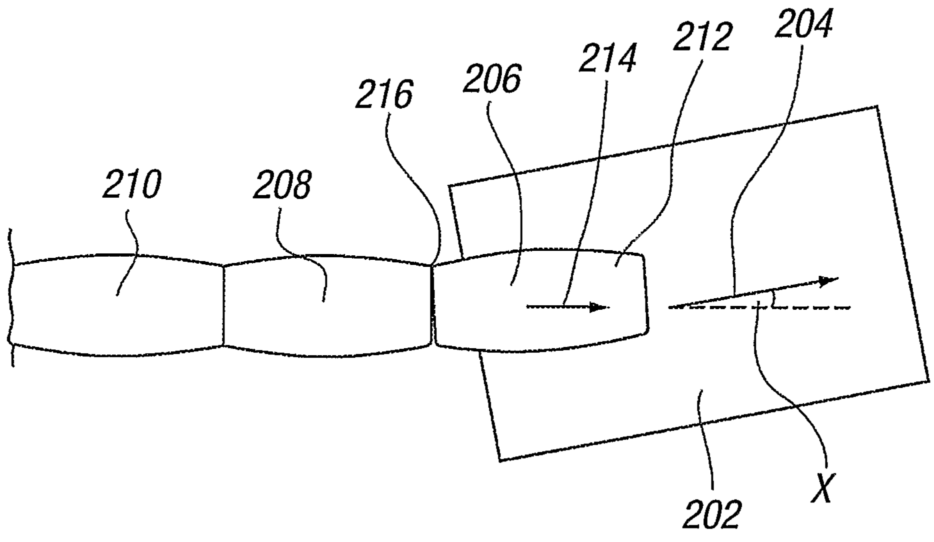

A further feature of the improvements herein described is the manner in which the label can be removed from the label substrate at the time of application to an article and FIGS. 7*a* and 7*b* illustrate two methods whereby this may be achieved.

In the applicant's previously mentioned patent, there is described the use of a beak or point by which to cause separation or breaking of the bridging portions between abutting edges of adjacent labels on the substrate and it is envisaged that this process can still be used in conjunction with the improvements herein described.

In FIG. 7*a*, there is illustrated an article 202 which is moved in a direction 204. A label 206 is shown which is connected to label 208 and in turn label 210 and so on as part of the roll of labels. The leading edge 212 of the label 206 is shown in attachment with the article and the labels are fed in a direction indicated by arrow 214. The separation of the label 206 from the label 208 is achieved by breaking the bridge portions of the edges at the interface 216.

In accordance with the method illustrated in FIG. 7*a*, the breaking of the interface 216 is encouraged or facilitated by providing no or a different, feed speed of the article 202 with respect to the feed speed of the labels 206 and 208. Typically, this change in speed is a temporary change which occurs when it is detected that the front edge 212 of the label 206 has adhered to the article 202. Once adherence has been achieved, then this means that the label 206 will effectively be moved at the speed of the article 202. The differentiation between this speed and the speed of feed of the remaining labels 208, 210 etc encourages the breakage at the line of weakening which is the interface 216. The change in speed can be achieved by controlling the operation of stepper motors which control the movement of the article 202 and the labels 208, 210. The change to cause the difference in speed will be for sufficient duration so as to cause breakage at the interface but then will return to a condition such that the feed speeds of the article and the labels are again the same until the next breakage of an interface is required.

An alternative method and apparatus is illustrated in FIG. 7*b* which illustrates a series of labels using the same reference numerals as FIG. 7*a*, in which label 206, 208 and 210 are attached and so on. Again, the interface 216 is required to be broken to allow the label 206 to be detached to be applied to the article 202. In FIG. 7*b*, the interface 216 is shown already partially broken in an exaggerated fashion for illustration purposes. In this case, the breakage of the interface 216 is achieved by providing the direction of travel of the article 204 angularly offset with regard to the direction of travel 214 of the labels. This angular offset X is illustrated in FIG. 7*b* in a much exaggerated form for illustration and it should therefore be appreciated that the actual angular offset will be one or a small number of degrees. The breakage is achieved because the label front end 212, once it adheres to the article 202 is caused then to travel in the direction 204 as opposed to the direction 214. This angular offset therefore causes a ripping or breaking effect on the interface 216 hence breaking the bridging portion connecting the respective labels 206 and 208 and providing the release of the label 206 from label 208.

It is envisaged that either or both of these methods of FIGS. 7*a* and 7*b* can be used separately or in conjunction to encourage the breaking of the bridging portions at the interface 216.

Figure 8B:
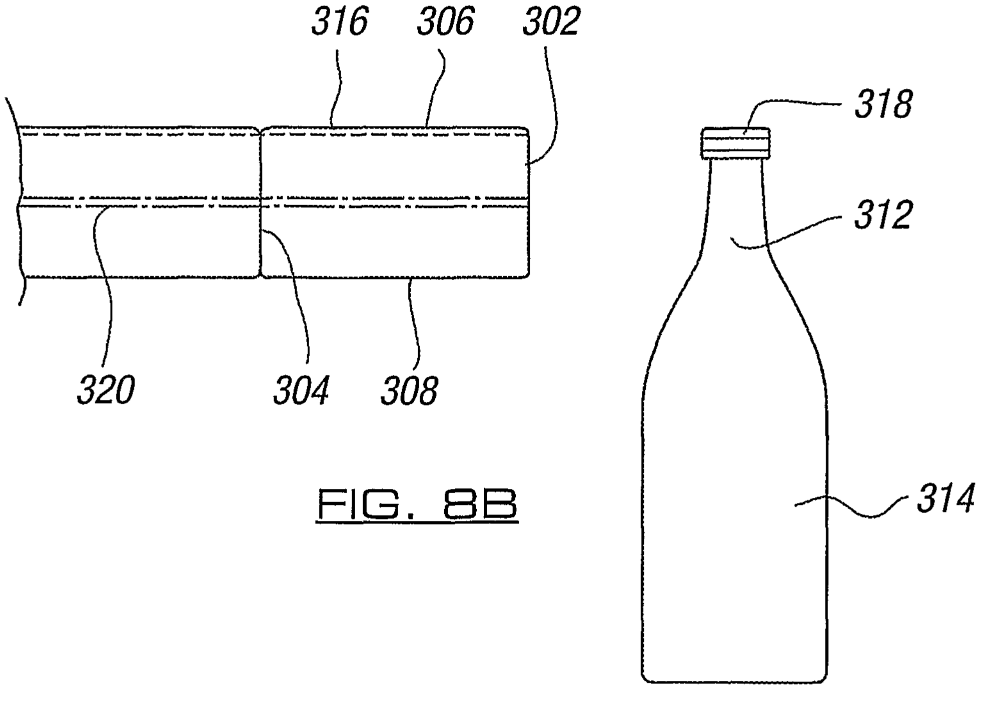

Referring now to FIGS. 8*a* and *b*, there is illustrated a further embodiment of the invention. In this case, the labels can be formed as previously described in accordance with any of the previous embodiments and a series of the same are illustrated in FIG. 8*b*. Each label has a leading edge 302, a trailing edge 304 and two side edges 306, 308 which join the leading and trailing edges. The leading edge is advanced to allow the label to be wrapped around an article such as, for example, a battery 310 as shown in FIG. 8*a* or the top portion 312 of a bottle 314 as shown in FIG. 8*c*. The label is of a length so as to allow the same to be wrapped entirely round the article such that the lead and trailing edges join and overlap.

Adjacent one or both of the side edges there are provided portions of the label 316 which depend inwardly from one or both of the side edges 306, 308 and on these portions, heat is applied so as to cause the same to shrink in size and as they do so, wrap around an edge or lip or other protrusion on the article and thereby engage the label to the article. For a battery therefore this provides an effective display label for the same.

In a further modification, one or more perforated lines 320 can be provided to run substantially parallel with the side edges of the labels as illustrated in FIG. 8*b*. The label is positioned onto the article in a manner such that the perforated lines need to be broken to remove a portion of the label prior to access being gained into the article such as, for example, to allow removal of the bottle 318 cap to gain access to the contents of the bottle 314. The perforated line therefore acts as a tamper evident means for the article once the label has been applied thereto.

Referring now to FIG. 9-*c* there is shown apparatus in accordance with one embodiment of the invention for applying labels principally of the linerless type as previously described. The apparatus includes a holder 402 for a roll of labels 404 of the type previously described. The roll of labels has a free end 406 which is fed from the roll 404 via a feed means comprising a roller 408 and a belt 410 which is driven via driven roller 12. The belt 10 passes around an applicator end 14 also referred to as a “beak”. The belt can be formed of a material to which the adhesive applied to the labels substrate 416 does not adhere and so the label surface 418 to which the adhesive is applied can be positioned to contact the belt as shown. The label substrate passes to the beak 414 under guide roller 420 and the free end 406 continues in the direction 422 to contact an article 424 which is being moved, in this case in direction 426 in FIG. 9*a* and direction 438 in FIGS. 9*b* and 9*c* at an angle to the direction of feed of the free end of the label.

The free end 406 of the label 428 contacts the moving article 424 and is pressed onto the same by the roller 430. As the article continues to move, the feed for the labels can be slowed or stopped momentarily so that a breaking force is applied by the label end 406 which is adhered to the moving article which moves with the article, on a discontinuous line 432 which joins the same to the following label 428'.

The force created is such as to cause the bridge portions of this line 432 to break and hence the whole label is then applied to the article. The next label 428' on the roll then forms the free end to be applied to the next article, the feed of the labels is restarted and the application process repeated for the next label and article and so on. As shown, in addition to the movement force, a blade 434 with an edge 436 is positioned to contact, with the weakened line 432, so as to encourage the weakened line bridge portions to shear and hence allow the label 428 to separate from label 428' along line 432 and so adhere fully to the article 424 and move off with the article. This procedure is followed for successive labels and articles respectively as they are fed into the appropriate position for the application of the label.

A further embodiment of apparatus in accordance with the invention is illustrated with reference to FIGS. 10*a-f*.

Figure 10A:
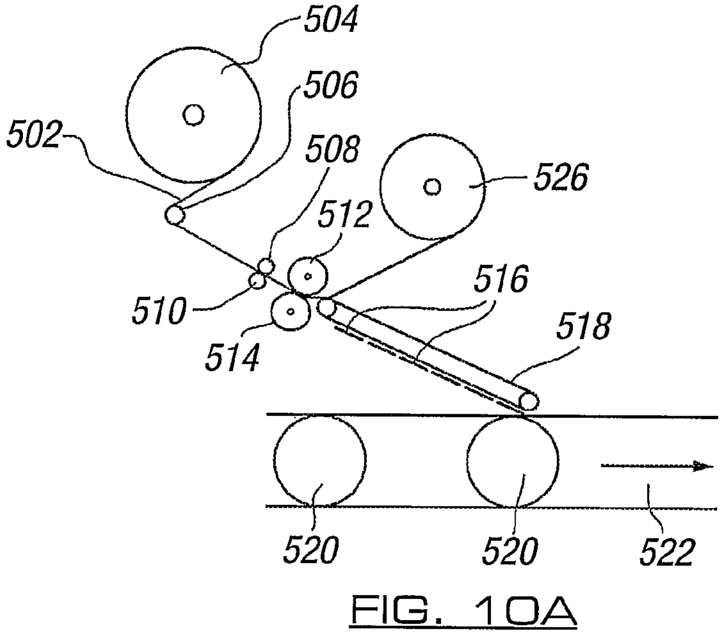

Referring firstly to FIG. 10*a* there is shown apparatus in accordance with one embodiment of the invention. The label substrate 502 is fed from the unwind roll 504 and travels over a jockey wheel 506 to keep the tension in the material through guide rollers 508, 510 into an anvil 512 and a cutter 514. The cutter can be a solid die, or a flexible die, mounted on a magnetic cylinder with a number of cutting impressions formed around the cylinder. The labels are cut and the labels

516 can be separated from each other completely at this stage as illustrated or preferably the abutting edges of the adjacent labels 516 are still joined as they move along the transfer belt by one or more bridging portions formed at the cutting die. The labels are then transferred from the anvil onto a transfer belt 518 for application subsequently on to articles 520 as they move along conveyor 522. If the labels are still attached to each other by bridging portions at the time of reaching the application point, the bridging portions are broken as the label adheres to the articles and hence tears away from the remainder of the labels on the transfer belt. Extraneous substrate material 524 after the labels have been cut therefrom is wound on to roller 526.

Figure 10B:
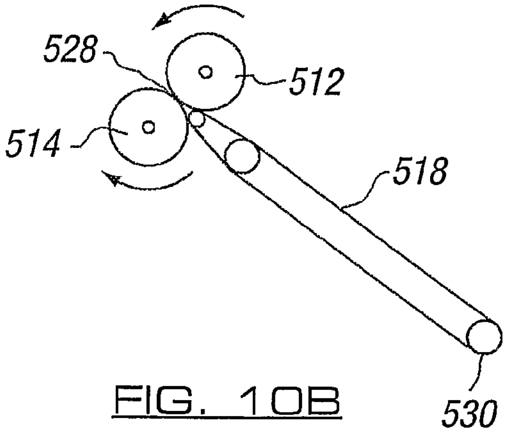

Turning now to FIG. 10*b*, the transfer belt 518 fits as close as possible to the point 528 where the cutters 514 and anvil 512 touch, giving the shortest distance for the label to travel onto the transfer belt. Once the label is positioned on the belt 518 it can then be applied to the product. This transfer belt acts as a beak at the end 530 adhesive can be applied in register at this point should it be required.

Figure 10C:
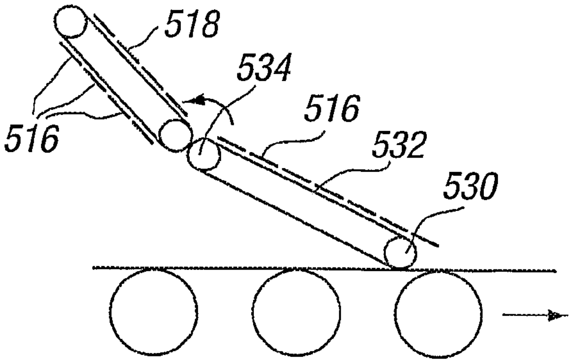

In FIG. 10*c* there is shown an extension 532 to the transfer belt 518 so that it is possible to cut the labels 516 and place them in a stream as a holding area to pass round the transfer belt 518. This helps the efficiency of the down time of the machine, particularly for reel changes so that for example, if there is no product to label then the labels do not pass from the belt 518 to extension 532 and therefore do not reach the application point or beak 530 until required. Control means in the form of a bridge 534 is placed between the two belts 518, 532 giving the flexibility to make the holding belt 518 variable in length to achieve greater running speed and also determine whether the labels 516 can pass from the belt 518 to belt 532 when the bridge is lowered. If the bridge 534 is raised, as shown, then the labels stay on the belt 518.

Using a magnetic cylinder, 514 and flexible die and servo drives for the same the magnetic cutter cylinder 514 can be a fixed diameter which need not be changed to suit the step and repeat of the cutter profile. A single cutter around part of the magnetic die would stay in register to the print using a "dance roller" (not shown) to index the material to the cutter.

Figure 10D:
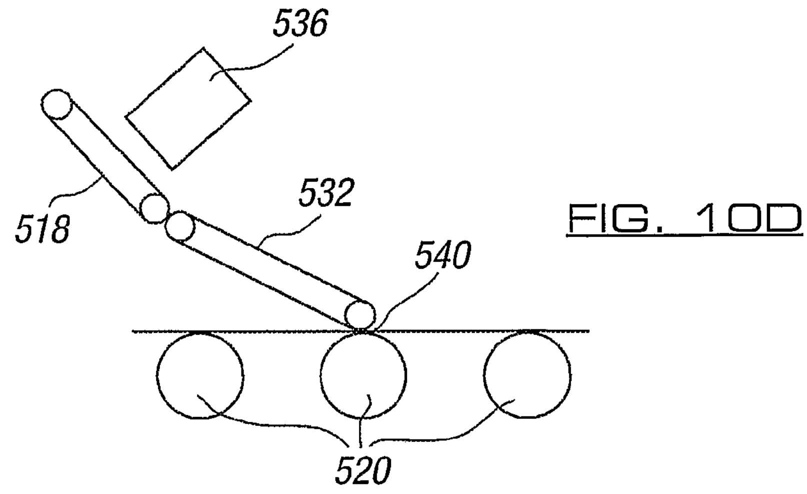

Turning now to FIG. 10*d* should a print station 536 be required, for example to apply variable data by inkjet/thermal/thermal transfer or laser means then this print station 536 can be positioned on the transfer conveyor 518 so as to allow printing to be applied which is relevant to a particular one of the articles 520, such as weight of the same, and then the label can subsequently be applied to the article as the same are fed to the application point 540.

Figure 10E:
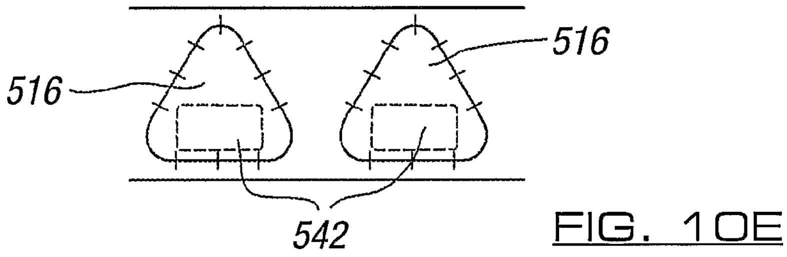

A laser cutter (not shown) can also be placed onto this transfer conveyor eliminating the need for a flexible cutter. In some applications security cuts are required as shown in FIG. 10*e* and by laminating a further substrate 542 at a point on the transfer conveyor 518 then items such as extended text labels, security tags redeemable coupons can be applied to the labels 516 on the transfer belt applicator as all parts can be held in register.

Figure 10F:
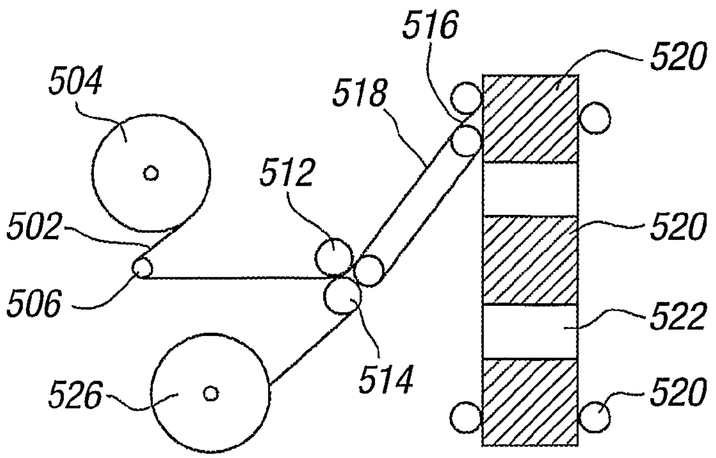

FIG. 10*f* shows a further embodiment of the apparatus described in FIGS. 10*a-e* and therefore utilises the same reference numerals and description.

Thus the apparatus allows, the cutting of labels 516 and transfer via at least one transfer belt 518 to the point of application 534 and onto articles 520 in a predicted and registered manner thereby allowing the application of variable printing and/or substrates and/or further cutting to be achieved in a predictable manner.

It should therefore be appreciated that the labels and method of forming the same as herein described provide many potential advantages and many potential uses.

The invention claimed is:

1. Apparatus for dispensing a series of labels in sequence onto one or more articles, said apparatus including a holder for a roll of labels, formed as a substrate, at least part of each of said labels defined by a line of weakening formed in the substrate prior to being moved into said roll of labels, feed means to allow the free end of said substrate to be fed to a dispensing applicator to expose the forward end of the foremost label to contact with an article to which the label is to be applied, feed means to move said article is provided and guide means is provided to guide said label free end into contact and adherence with said article, and subsequent movement of the article with the free end of the label applied thereto causes the reminder of that label to be torn from the substrate and apply to the article, said tear occurring of bridge portions formed along the line of weakening formed between adjacent labels and/or a label and extraneous substrate material and a blade is positioned so as to be able to contact the substrate at or adjacent to the line of weakening between the foremost label and the remainder of the labels substrate, and wherein control means is provided to control the speed of movement of the labels such that one of the labels or article are moved faster than the other for at least a period of time to create a breaking force which, in conjunction with the contact of said blade with said substrate at or adjacent to the line of weakening at the time when the tearing of the line of weakening is required, causes said line of weakening to be broken and the removal of the label being applied to the article from the adjacent label to which it is attached.

2. Apparatus according to claim 1 wherein the blade is fixed in position.

3. Apparatus according to claim 1 wherein the blade is movable towards the substrate in a reciprocal manner.

4. Apparatus according to claim 1 wherein the substrate is positioned on feed means in the form of a belt and fed to the applicator.

5. Apparatus according to claim 4 wherein the belt is driven and acts as a feed for the substrate.

* * * * *